Oct. 26, 1965 N. CORDIS 3,213,873
SELF-POWERED FLUID TREATER
Filed May 23, 1961 3 Sheets-Sheet 1
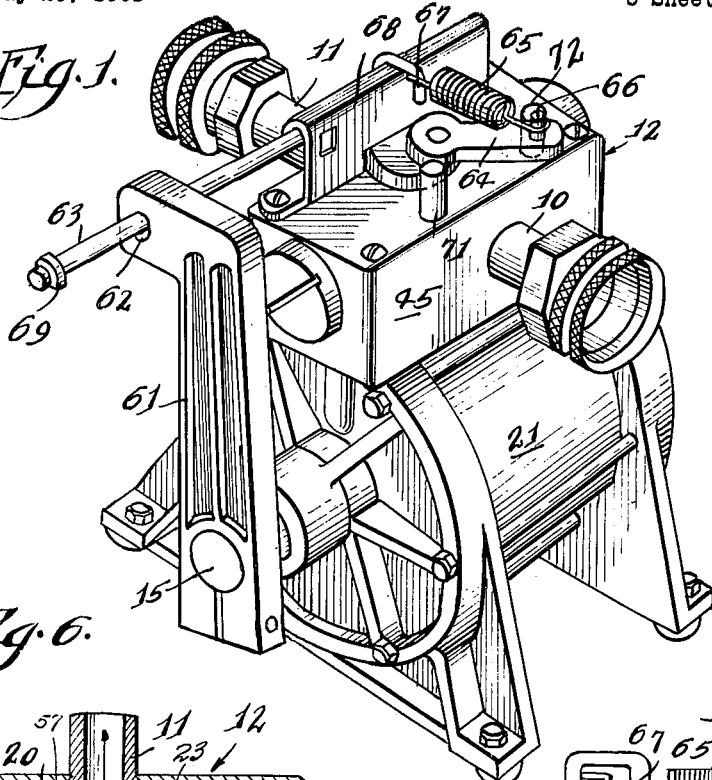
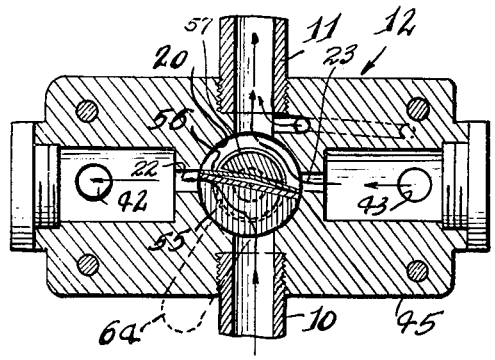
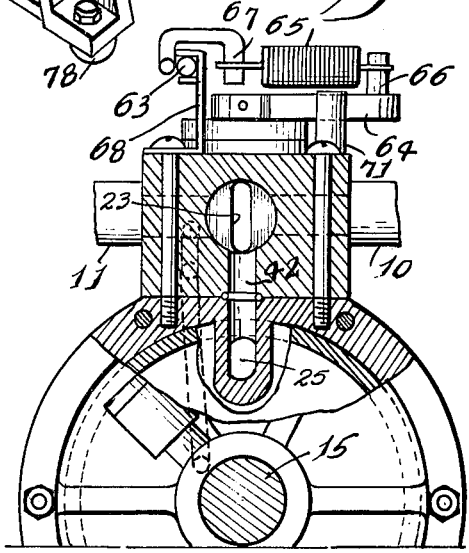
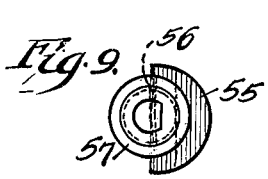
Inventor.
Nat Cordis.
By Everett A. Johnson
Attorney.

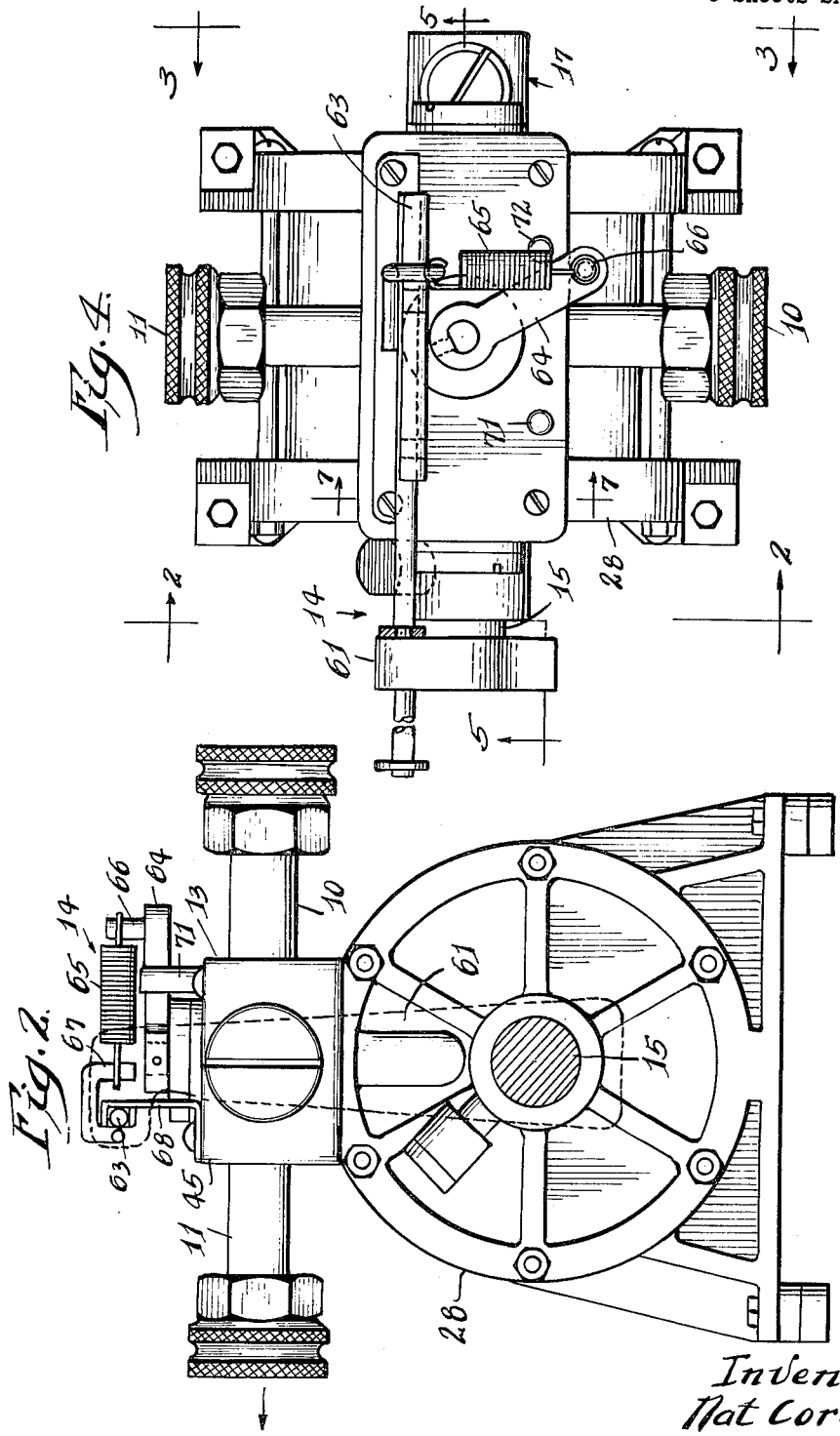

Oct. 26, 1965  N. CORDIS  3,213,873
SELF-POWERED FLUID TREATER
Filed May 23, 1961  3 Sheets-Sheet 3
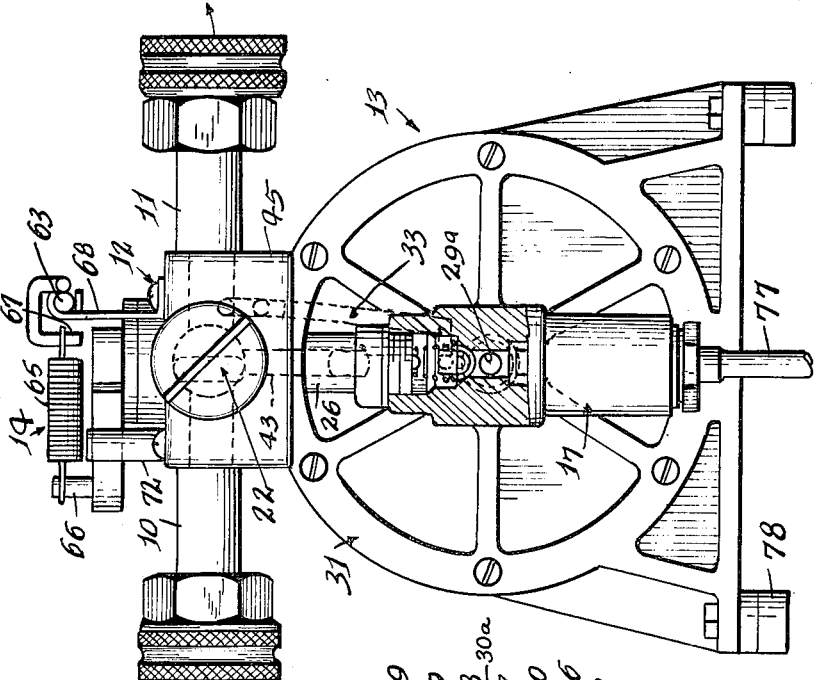
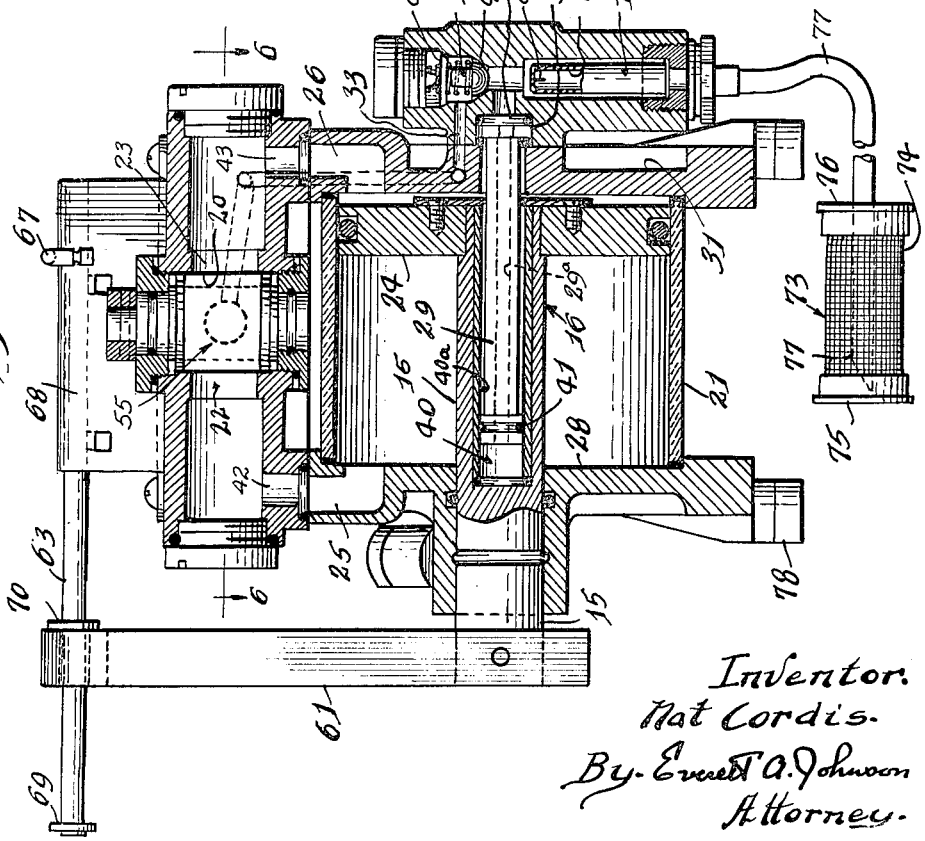
Inventor.
Nat Cordis.
By- Everett A. Johnson
Attorney.

United States Patent Office 3,213,873
Patented Oct. 26, 1965

3,213,873
SELF-POWERED FLUID TREATER
Nat Cordis, Silver Lake, Wis.; Gladys S. Cordis, executor of Nat Cordis, deceased, assignor of two-thirds to Carl F. Jensen, and one-third to Gerald T. Dobie, both of Chicago, Ill.
Filed May 23, 1961, Ser. No. 111,992
5 Claims. (Cl. 137—99)

This application is a continuation-in-part of co-pending application Ser. No. 13,863, filed March 9, 1960, issued as U.S. 3,114,379. This invention relates to a self-powered fluid proportioning apparatus of the type adapted for mixing a treating fluid with a raw fluid and discharging the fluids into a distribution means. More particularly, the invention relates to a system for medicating drinking water of live stock, including poultry, wherein a stream of water powers the apparatus.

Many types of equipment have heretofore been proposed for feeding one fluid, including drugs, vaccines, nutrients, sanitizing, deodorizing, and softening materials and the like into a second fluid stream such as water. Such prior systems, however, have been complicated in construction, unreliable in operation, cumbersome in use, not adapted for both portable and automatic continuous installation, or have not been self-powered.

A primary object of the invention is to provide a system for feeding a first fluid into a second fluid in selected proportions over a wide range of pressures and flow rates of the second fluid. An additional object of the invention is to provide an efficient and reliable device which is portable and rugged. Another object of the invention is to provide a system which requires no power for operating the apparatus other than the flowing stream being treated. It is a further object of the present invention to provide new and novel self-powered apparatus for continuously and automatically treating raw water streams with a fluid treating agent. It is also an object of the invention to provide an apparatus particularly adapted for use in medicating the drinking water of poultry and for delivering the treated water under pressure into the water distribution system, such as a system including drinking troughs having float-controlled inlet valves. These and other objects of the invention will become apparent as my description thereof proceeds.

Briefly, according to my present invention, I provide a self-propelled fluid blending or treating apparatus which includes a hydraulic master motor means operated by a primary raw fluid to be treated, a slave pump means for the treating fluid actuated by such motor, and a delivery manifold means through which the fluid used to operate the motor and the treating fluid from the slave pump are discharged. Such delivery manifold means may include a mixing chamber.

The slave pump and hydraulic motor comprise a unitary system wherein piston means in the hydraulic motor is provided with a cylindrical chamber reciprocatable along or over a fixed slave hollow pump plunger. A pumping chamber having check valve means communicates with the fixed hollow plunger and the treating agent and the water are discharged into the delivery manifold means wherein the fluids become intimately mixed. Details and advantages of the apparatus, in accordance with this invention, will be described by reference to the accompanying drawings wherein:

FIGURE 1 is an elevation in perspective;
FIGURES 2 and 3 are opposite end elevations;
FIGURE 4 is a top view;
FIGURE 5 is a vertical section taken along the line 5—5 in FIGURE 4;
FIGURE 6 is a section taken through the valve block along the line 6—6 in FIGURE 5;
FIGURE 7 is a section taken along the line 7—7 in FIGURE 4; and
FIGURES 8 through 11 illustrate details of the gating valve mechanism of FIGURES 5 and 6.

Referring to the drawings, the apparatus illustrated includes the water inlet 10, the water outlet 11, the water-gating assembly 12, the water motor 13, reset tappet means 14, connecting rod 15, slave pump 16, and treating agent valve chamber means 17 having inlet 18 and outlet 19.

The water enters the valve chamber 20 in the water-gating assembly 12 through line 10 and is gated into the motor body 21 via ports 22 or 23 to apply fluid pressure on alternate sides of the motor piston 24 via channel 25 or 26. The slave pump 16 comprises a connecting rod 15 carried by the piston 24, rod 15 passing through one end wall 28 of the motor body 21. The tubular pump plunger 29 is mounted by an end flange 30 in the opposite wall 31 of the motor body 21 and is provided with the O-ring gaskets 30a on both sides of the flange 30, as shown in FIGURE 5.

The slave pump valve means 17 fixed to the end wall 31 contains the inlet and outlet check valve assemblies 18 and 19, the inlet connection 32 and outlet channel 33. A bore 40 in an end of rod 15 accommodates the fixed tubular pump plunger 29, the cylinder 40 operating to-and-fro over the plunger 29 having O-ring 41 in response to the movement of the motor piston 24. The cylinder 40 is preferably provided with glass liner 40a. The piston 24 is driven by the water entering the gating system 12, 22, 23 and expelled by the piston 24 alternately through channels 42 and 43, shunt valve 55 and the manifold valve block 45 which discharges through outlet 11.

When the connecting rod 15 moves the cylinder 40 away from the pumping plunger 29, treating fluid is drawn into the treating agent valve assembly 17 through the "open" inlet check valve 18 and at the same time the suction produced by the withdrawal of the cylinder 40 about the hollow plunger 29 closes the outlet check valve 19, which when subsequently opened discharges through the manifold block 45 via channel 33 and line 11.

When the direction of travel of the pumping cylinder 40 is reversed over the hollow plunger 29 in following the motion of the motor piston 24 through the rigid connecting rod 15, the inlet check valve 18 closes and the outlet check valve 19 opens so that the treating fluid trapped in the pumping barrel 29a within plunger 29 and cylinder 40 is ejected under pressure into outlet conduit 11 in the manifold 45 via channel 33. The water and medication leave the manifold 45 in a proportion based upon the displacement volume of the slave pump 16 and the volume of the motor chamber 21 on either side of the motor piston 24. The proportions of raw fluid (water) to treating agent (drug) can be preadjusted by selection of the dimensions of bore 40, barrel 29a, etc.

If desired, a multiplicity of check valve-pump assemblies may be provided and actuated by the water motor 13. In this way several types of treating agents or additives may be blended with the water at the same time.

The pumping valve block 17 houses the inlet check valve 18 and the outlet valve 19. The inlet check valve 18 comprises a deformable hollow cylinder 46 having a self-closing port 47. The outlet check valve 19 comprises a plug 48 held by spring 49 against the valve seat. A delivery channel communicates with the valve block 17 above the spring-loaded plug 48 and discharges by channel 33 into the manifold 45.

The slave pump 16 includes the cylinder shaft 15 comprising the connecting rod for piston 24 with its pump cylinder bore 40. The treating fluid plunger 29 is tubular with an internal pumping channel 29a. An O-ring 41 on the free end of the pumping plunger 29 engages the wall of the pump cylinder 40 to provide a pumping seal.

On a suction stroke of the pumping cylinder 40 the elastic cylinder 46 of inlet check valve 18 expands to open the port 47; and the plug 48 on the outlet check valve 19 is held over the outlet port. When the pumping cylinder 40 is on the ejection stroke, this situation is reversed so that the plug 48 is lifted and the port 47 in cylinder 46 is closed.

The gating system 12 within the valve block 45 includes a valve plug 55, the valve leaf spring 56, and the valve shaft 57 disposed within the valve chamber 20 in the valve block 45. These components are shown in detail and in subassembly by FIGURES 6 through 11 in the drawings. In FIGURE 6, the valve block 45 is shown in cross-section and illustrates the alternate positions of plug 55 and flows through the channeled block.

Opposite ends of the valve shaft 57 are provided with O-rings 59 and 60 to effect a fluid-tight seal. The valve plug 55 is shifted from two extreme positions, alternately closing and exposing the ports 22 and 23 leading to channels 42 and 43 (FIGURES 6 and 7), respectively, which direct the flowing fluid to opposite sides of the motor piston 24. The flow ports 22 and 23 (FIGS. 6 and 7) are aligned in respect of each other and disposed toward the outlet 11 in respect of the axis of the valve post 57 and the supply conduit 10.

The connecting rod 15 projects through the end wall 28 and supports the actuating arm 61 which terminates at its upper end in a bore 62 through which the reversing rod 63 passes. A pair of C-rings 69 and 70 on the reversing rod 63 comprise travel stops contacted by the arm 61 for shuttling the reversing rod 63 between its positions.

The upper end of the valve shaft 57 is provided with a toggle lever 64 which is actuated by coil spring 65 anchored at one end to the post 66 carried by the free end of toggle lever 64, and is anchored at its other end by the inverted post 67 which is fixed to the shiftable reversing rod 63 which is slidably carried within the guide 68 secured to the valve block 45.

When the actuating arm 61 contacts either of the stops 69 or 70, the movement of the actuating arm 61 is imparted to the reversing rod 63 which in turn shifts the spring anchor post 67 with the result that the spring 65 swings about the post 66 carried by the toggle lever 64 until there has been sufficient travel thereof to shift the toggle lever 64 by the action of the spring 65. When this occurs, the valve shaft 57 is rotated and moves the valve plug 55 to a different diverting position. The travel or throw of the free end of the toggle lever 64 is controlled and restricted by posts 71 and 72 fixed to the valve block assembly 45.

As the piston 24 travels in the motor cylinder 21 the connecting rod 15 carries the actuating arm 61 with it causing the toggle lever 64 to pivot between the two positions determined by the posts 71 and 72. At the limits of travel of the reversing rod 63, the valve plug 55 is placed in the alternate positions as shown in the drawings. This causes the water to course through the channels 42 or 43 leading to the opposite sides of the piston 24 thereby displacing the piston 24 to opposite ends of the motor cylinder 21 and actuating the slave pump 16 as described.

In the illustrated embodiment of the invention, the end walls 28 and 31 are secured to the motor body 21 by bolts, but it will be apparent that other securing means may be used.

In operation, the strainer assembly 73 connected to the inlet end of the conduit is placed within a vessel containing the treating agent. The strainer 73 includes a cylindrical screen 74 and two end plates 75 and 76, one of which is provided with a port to receive the tubing or conduit 77. When a fine screen is used, the strainer may be weighted with a ball bearing or the like so as to assure that the inlet end of the conduit remains near the bottom of the vessel.

The invention has been described with reference to discharging mixed fluids from the conduit 11. If desired, this may be discharged into an auxiliary mixing chamber (not shown), but ordinarily, this is not necessary inasmuch as the distribution system downstream of the proportioner provides adequate agitation and mixing.

The drawings accompanying this specification show numerous details of construction which have not been designated by individual reference numerals. However, it will be apparent to one skilled in the art that these details include such items as grease cups, hose connectors, screws, valve block plugs, O-rings and the like. The end plates 28 and 31 are provided with feet 78, but it is contemplated that screws or bolts may be substituted for securing the apparatus to a base (not shown).

Materials of construction will be selected to be compatible with the fluids. For example, with corrosive treating agents I may use a nylon pumping plunger 29a in a glass or stainless steel sleeve 40a in cylinder 40, and the check valve assemblies 18 and 19 in block 17 may be of plastic or stainless steel. Other metals provided with ceramic or plastic coatings also may be used.

Although I have described my invention with particular reference to a preferred embodiment thereof, it should be understood that this is by way of illustration only and that modifications therein may be made in view of my teachings without departing from the spirit and scope of the invention.

What I claim is:

1. A portable self-powered fluid proportioning device which comprises in combination, fluid supply conduit means, constant displacement slave pump means, constant displacement hydraulic motor means into which the total flow from said supply conduit discharges, said slave pump means and said motor means having outlet conduit means discharging concurrently through delivery conduit means, flow diverting plug valve means disposed intermediate said fluid supply means and said outlet conduit means, said flow diverting valve means including a multi-ported cylindrical chamber, a first pair of substantially diametrically arranged ports in said chamber in communication with said supply conduit means and said outlet conduit means, respectively, rotatable valve plug including a rotatable post extending longitudinally through said chamber and of substantially lesser diameter than said chamber, a flow diverting planar plug element arranged transverse to the flow path between said first pair of ports and positioned by the rotation of said post, a second pair of ports, each port having the configuration of a narrow slot through the wall of said chamber with the longer dimension being generally parallel to the plane of the said planar plug, wing portions on said plug element projecting across the flow channels about said post in said chamber and alternating the direction of flow through each of said slots in said second pair of ports upon rotation of said post, said slave pump means comprising a fixed tubular pump means, master piston means in said motor means, flow channel means communicating with opposite sides of said piston and terminating at one of said slots, slave barrel means in said pump means operating co-axially with said tubular fixed pump means and reciprocating with said master piston means, and paired check valve means supported by said motor means for gating a second fluid through said slave pump means.

2. The fluid proportioning device according to claim 1 wherein said slave pump means is of substantially smaller displacement than said master piston means in said motor means and the device includes connecting rod means carried by said master piston means, and said connecting rod means is of substantially smaller diameter than said master piston, said paired check valve means including a valve body having an inlet, a first check valve controlling flow through said inlet, an outlet from said body, said tubular pump means being adapted alternately to withdraw and supply pumping fluid from and to said body, a bridging wall across said body intermediate said pump means and said outlet, a flow port through said bridging wall, and a poppet check valve interposed said outlet and said port, said poppet check valve being adapted to prevent flow through said port when said pump means withdraws pumping fluid from said body whereby said first check valve opens to admit pumping fluid to said body.

3. A portable, self-powered, multiple-fluid proportioning device which comprises in combination, first fluid supply conduit means, constant displacement fluid motor means into which said supply conduit discharges, constant displacement slave pump means, said motor means having outlet conduit means through which said pump and motor means discharge into delivery conduit means, master piston means in said motor means, said slave pump means having a reciprocating element axially aligned with said master piston means, control valve means interposed said first fluid supply means and said motor means for gating the first fluid through said motor means on alternate sides of said master piston means, spring loaded means carried by said motor means and having an oscillating portion which shifts said control valve means, said control valve means including a post and an arm fixed thereto and loaded by said spring, said post extending longitudinally through said chamber and being of substantially lesser diameter than said chamber, annular flow channels about said post within said chamber, a planar flow diverting element arranged transverse to the flow paths between said fluid supply means and said motor means and between said motor means and said outlet conduit through said annular flow channels, said flow diverting element being positioned upon rotation of said post, paired check valve means gating a proportioned quantity of a second fluid through said pump, said second fluid being discharged into said delivery line commingled with said first fluid, said check valve means including an elongated flow chamber, an inlet and an outlet at opposite ends of said chamber, a first inlet check valve across the inlet of said chamber, an outlet check valve controlling the unidirectional flow through said chamber from said inlet check valve to said outlet, said outlet check valve comprising a poppet valve carrying a plug on its upstream side and a coil spring acting on its downstream side, said spring being compressed in response to increased fluid pressure in said flow chamber to expose said normally closed outlet whereby said second fluid is discharged from said chamber.

4. The fluid proportioning device according to claim 3 wherein the said control valve means comprises a separable plug plate member which exposes alternate fluid flow ports, said ports being in alignment with each other and disposed from said supply conduit toward the said outlet conduit means, and said arm operates in a plane parallel to said reciprocating element.

5. The device of claim 3 which includes a snubber for the free end of the spring-loaded valve-shifting means whereby the control valve means remains open for substantially the full travel of the master piston within said motor means and for substantially the full stroke of the slave pump.

References Cited by the Examiner
UNITED STATES PATENTS

| | | |
|---|---|---|
| 788,071 | 4/05 | Schiffbauer. |
| 1,458,922 | 6/23 | Rivera _____ 91—345 |
| 2,080,809 | 5/37 | Dinkel _____ 103—51 |
| 2,124,797 | 7/38 | Rust _____ 91—345 |
| 2,444,182 | 6/48 | Calvin _____ 137—512.3 |
| 2,595,211 | 4/52 | Le Clair _____ 137—512.3 |
| 2,635,585 | 4/53 | Damgaard _____ 91—345 XR |
| 2,765,624 | 10/56 | Hoschle _____ 60—54.5 |
| 2,803,260 | 8/57 | Wells _____ 137—99 |
| 2,841,165 | 7/58 | Emery _____ 137—99 |
| 2,887,094 | 5/59 | Krukemeier _____ 137—98 XR |

ISADOR WEIL, *Primary Examiner.*